United States Patent
Turner

(10) Patent No.: US 11,827,382 B2
(45) Date of Patent: Nov. 28, 2023

(54) DAYSIDE-ONLY ROLL STEERING

(71) Applicant: MAXAR SPACE LLC, Palo Alto, CA (US)

(72) Inventor: Andrew E. Turner, Mountain View, CA (US)

(73) Assignee: Maxar Space LLC, Palo Alto, CA (US)

( * ) Notice: Subject to any disclaimer, the term of this patent is extended or adjusted under 35 U.S.C. 154(b) by 340 days.

(21) Appl. No.: 17/076,444

(22) Filed: Oct. 21, 2020

(65) Prior Publication Data

US 2021/0354857 A1   Nov. 18, 2021

Related U.S. Application Data

(60) Provisional application No. 63/024,825, filed on May 14, 2020.

(51) Int. Cl.
| | |
|---|---|
| *B64G 1/24* | (2006.01) |
| *B64G 1/44* | (2006.01) |
| *B64G 1/40* | (2006.01) |
| *B64G 1/28* | (2006.01) |

(52) U.S. Cl.
CPC .............. *B64G 1/244* (2019.05); *B64G 1/28* (2013.01); *B64G 1/40* (2013.01); *B64G 1/443* (2013.01)

(58) Field of Classification Search
CPC . B64G 1/244; B64G 1/28; B64G 1/40; B64G 1/443; B64G 1/283; B64G 1/36; B64G 1/361; B64G 1/242
See application file for complete search history.

(56) References Cited

U.S. PATENT DOCUMENTS

| | | | |
|---|---|---|---|
| 6,164,597 A | 12/2000 | Barker et al. | |
| 6,293,502 B1 * | 9/2001 | Fowell | B64G 1/244 |
| | | | 244/164 |
| 6,311,932 B1 * | 11/2001 | Rodden | B64G 1/285 |
| | | | 244/165 |

(Continued)

FOREIGN PATENT DOCUMENTS

EP   1092626 A2 *   4/2001   ............... B64G 1/24

OTHER PUBLICATIONS

International Search Report and Written Opinion dated Jul. 2, 2021 in International Application No. PCT/US2021/024729.

(Continued)

*Primary Examiner* — Assres H Woldemaryam
(74) *Attorney, Agent, or Firm* — Vierra Magen Marcus LLP

(57) ABSTRACT

A method of roll steering of a spacecraft to align an aspect of the spacecraft, such as the surface of solar arrays carried by the spacecraft, to the sun, is described. The roll steering occurs only when the sun is at an angle (β) relative to the orbital plane of the spacecraft and when the spacecraft is not eclipsed by a body it is orbiting. This dayside-only roll steering of the spacecraft increases the power efficiency of the spacecraft. A spacecraft may include a controller which causes an attitude control subsystem to steer the spacecraft about a roll axis to position the surface of the solar array such that an axis normal to the surface of the solar array is aligned with the direction to a sun when the sun is visible to the spacecraft, and maintain a fixed orientation of the spacecraft about the roll axis when the sun is not visible to the spacecraft.

18 Claims, 13 Drawing Sheets

(56) References Cited

U.S. PATENT DOCUMENTS 7,357,356 B1 * 4/2008 Goodzeit ................ B64G 1/36
701/13

OTHER PUBLICATIONS

Hoffman, David J., et al. "Concept Design of High Power Solar Electric Propulsion Vehicles for Human Exploration", NASA Center for AeroSpace Information, Technical Memorandum, NASA/TM-2011-217281, Dec. 1, 2011, pp. 1-10.
Pederson, Dylan M., et al. "Analysis of Roll Steering for Solar Electric Propulsion Missions", 48th AIAA/ASME/SAE/ASEE Joint Propulsion Conference & Exhibit, Jul. 30, 2012, pp. 1-10.
Oglevie R., et al. "Attitude Control Requirements for an Earth-Orbital Solar Electric Propulsion Stage", American Institute of Aeronautics and Astronautics, Mar. 19, 1975, pp. 1-9.
International Preliminary Report on Patentability dated Nov. 24, 2022, International Application No. PCT/US2021/024729.
Communication Pursuant to Rules 161(1) and 162EPC dated Oct. 10, 2022, European Patent Application No. 21720116.9.
Response to Communication Pursuant to Rules 161(1) and 162EPC dated Jul. 25, 2023, European Patent Application No. 21720116.9.

\* cited by examiner

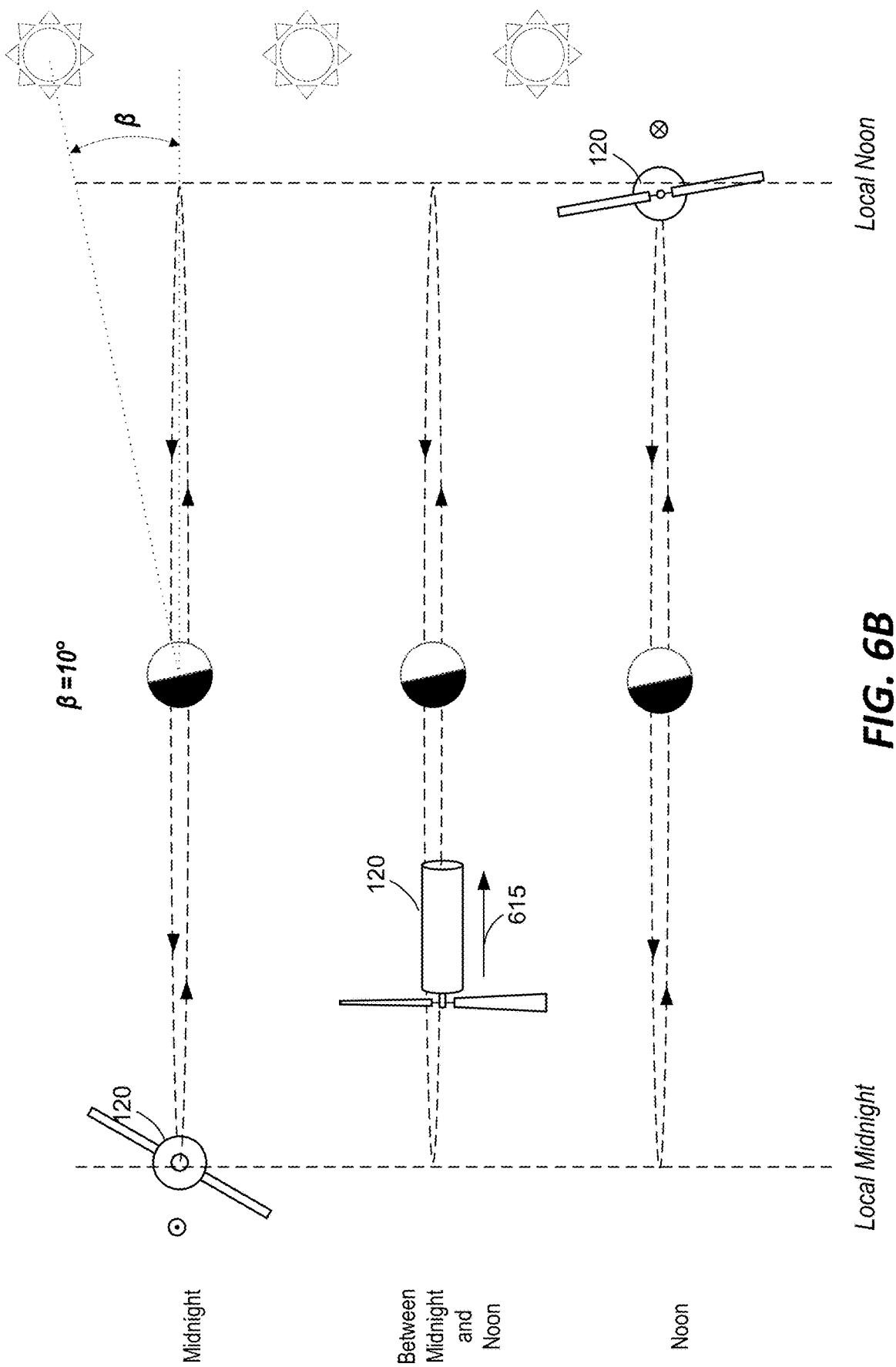

DAYSIDE-ONLY ROLL STEERING

CLAIM FOR PRIORITY

This application claims the benefit of priority to U.S. Provisional App. 63/024,825, filed May 14, 2020, the entire contents of which are hereby incorporated by reference.

BACKGROUND

Spacecraft use solar arrays to harness the power of the sun to sustain operability for long periods of time in space. Spacecraft in orbit about a primary body, such as Earth, benefit from positioning the solar array at an optimal angle toward the sun relative to their position in orbit. One well-established technique for such positioning is yaw steering, which involves rotating the spacecraft body about its yaw axis to position the solar array. The yaw axis is the axis originating at the spacecraft and passing through the center of the primary body when the spacecraft is in its nominal attitude. Once the spacecraft is in orbit at the desired orbital location, the spacecraft is operated to follow a yaw steering profile so that the axis of the solar array is substantially normal to a plane containing the sun vector and nadir vector. The orbit of the spacecraft can be controlled by applying an additional bias to the yaw steering profile. This action has been used in U.S. Pat. No. 6,164,597 by Barker et al. to rotate the spacecraft around an axis that points toward the primary body, the yaw axis, by a predetermined angular amount to cause a reflected component of the solar radiation pressure to selectively apply a force to the spacecraft that translates or alters the position of the spacecraft in orbit the spacecraft to perform station keeping maneuvers.

In most cases, spacecraft perform maneuvers to compensate for air drag or other maneuvers in the forward or reverse direction using thrusters. Yaw steering causes the thrusters to be rotated away from the velocity vector direction, which precludes use of the thrusters to compensate for air drag or other work to efficiently modify the orbit. U.S. Pat. No. 6,164,597 describes an application of steering a spacecraft around its yaw body axis to maintain Earth pointing while permitting the solar arrays to maintain sun pointing.

SUMMARY

According to one aspect of the present disclosure, one general aspect includes a method of orienting a spacecraft that orbits about a primary body, the spacecraft having a solar array having a surface. The method includes establishing an orbital path of the spacecraft about the primary body, the spacecraft having a direction of orbital motion along the orbital path and determining a portion of the orbital path during which the spacecraft is in eclipse. The method also includes roll steering the spacecraft about the axis in the direction of orbital motion to favorably position the surface of the solar array. Using this roll steering, an axis normal to the surface of the array is aligned with in the direction to a sun only when the spacecraft is not in eclipse. This is achieved by selectively applying a force to the spacecraft which rotates the spacecraft body about the axis in the direction of orbital motion, i.e. the roll axis. Other embodiments of this aspect include corresponding computer systems, apparatus, and computer programs recorded on one or more computer storage devices, each configured to perform the actions of the methods.

This aspect of the method may include a method where the orbital path forms an orbital plane and a Beta angle is formed between the orbital plane and a ray from the primary body in a direction to the sun, and the roll angle is determined by the Beta angle. The method may include a method which further includes maintaining an attitude of the spacecraft when the spacecraft is in eclipse. The method may include a method where the roll steering has a maximum roll rate magnitude about the axis in the direction of orbital motion which is relatively constant for all Beta angles. The method may include a method where the roll steering has a maximum roll acceleration axis in the direction of orbital motion which is relatively constant for all Beta angles. The method may include a method where the method includes performing spacecraft maneuvers at any time in a forward and aft direction along the axis in the direction of orbital motion while roll steering is performed. The method may include a method where the orbit has an orbital period, where the orbital path forms an orbital plane and a Beta angle is formed between the orbital plane and an axis from the orbital body toward the sun, and where the roll steering is suspended when the magnitude of the Beta angle is less than approximately 10 degrees. Implementations of the described techniques may include hardware, a method or process, or computer software on a computer-accessible medium.

Another general aspect includes a method of rotating a body of a spacecraft with solar arrays around a roll axis, which is the axis in the direction of orbital motion of the spacecraft, when the spacecraft is in its nominal attitude. The orbital motion follows an orbital path defining an orbital plane. The method includes determining a portion of the orbital path during which the spacecraft is in eclipse. The method also includes steering the spacecraft about the roll axis to position a surface of a solar array of the spacecraft such that an axis normal to the surface of the solar array is at an angle to the direction to the sun when the sun is visible to the spacecraft by selectively applying a force to the spacecraft that rotates the body of the spacecraft about the roll axis. The method also includes maintaining a fixed orientation of the spacecraft about the roll axis when the sun is not visible to the spacecraft. Other embodiments of this aspect include corresponding computer systems, apparatus, and computer programs recorded on one or more computer storage devices, each configured to perform the actions of the methods.

This aspect of the method may further include a method where the steering has a maximum roll rate magnitude about the roll axis which is relatively constant for all Beta angles. The method may further include a method where the steering has a maximum roll acceleration about roll axis which is relatively constant for all Beta angles. The method may further include a method where the method includes performing spacecraft maneuvers at any time in a forward and aft direction along the roll axis in the direction of orbital motion while roll steering is performed. This is feasible because a rotation about the roll axis does not rotate thrusters on the forward or aft end of the spacecraft away from the direction of orbital motion. Implementations of the described techniques may include hardware, a method or process, or computer software on a computer-accessible medium.

Another aspect includes a spacecraft including a solar array having at least one surface; a propulsion subsystem; and an attitude control subsystem. The spacecraft also includes a controller connected to the propulsion subsystem and the attitude control subsystem, the controller configured to cause the propulsion subsystem and attitude control subsystem to propel the spacecraft along an orbital path in orbital motion around a primary body, and the controller configured to cause the attitude control subsystem to rotate the spacecraft around its roll axis which is nominally aligned with the direction of orbital motion. In this aspect, the controller causes the attitude control subsystem to steer the spacecraft about the roll axis to position the surface of the solar array such that an axis normal to the surface of the solar array is aligned in the direction to a sun when the sun is visible to the spacecraft, and maintain a fixed orientation of the spacecraft about the roll axis when the sun is not visible to the spacecraft.

Implementations may include one or more of the following features: the spacecraft where the orbital path forms an orbital plane and an axis between the primary body and the sun form a second angle, referred to as the Beta angle, and the roll angle is determined by the second angle; the spacecraft where the controller configured to cause the attitude control subsystem to rotate the spacecraft at a maximum roll rate magnitude about the roll axis which is relatively constant for all Beta angles; the spacecraft where the controller configured to cause the attitude control subsystem to rotate the spacecraft at a maximum roll rate acceleration about the roll axis which is relatively constant for all Beta angles; and the spacecraft where the controller configured to cause the attitude control subsystem and the propulsion control subsystem to perform spacecraft maneuvers at any time in a forward and aft direction along the orbital path the direction of orbital motion while the controller causing the attitude control subsystem to steer the spacecraft about the roll axis.

BRIEF DESCRIPTION OF THE DRAWINGS

Aspects of the present disclosure are illustrated by way of example and are not limited by the accompanying figures for which like references indicate the same or similar elements.

FIGS. 6A-6C are illustrations of a spacecraft orbiting a primary body where the orbital plane of the spacecraft relative to the sun forms angles of 0°, 10° and −10°, respectively.

DETAILED DESCRIPTION

In one aspect, technology is described for the use of roll steering of a spacecraft to align an aspect of the spacecraft, such as the surface of solar arrays carried by the spacecraft, to the sun when the sun is at an angle ($\beta$) relative to the orbital plane of the spacecraft only when the spacecraft is not eclipsed by a body it is orbiting. This dayside-only roll steering of the spacecraft increases the power efficiency of the spacecraft as well as providing other advantages described herein.

Figure 1:
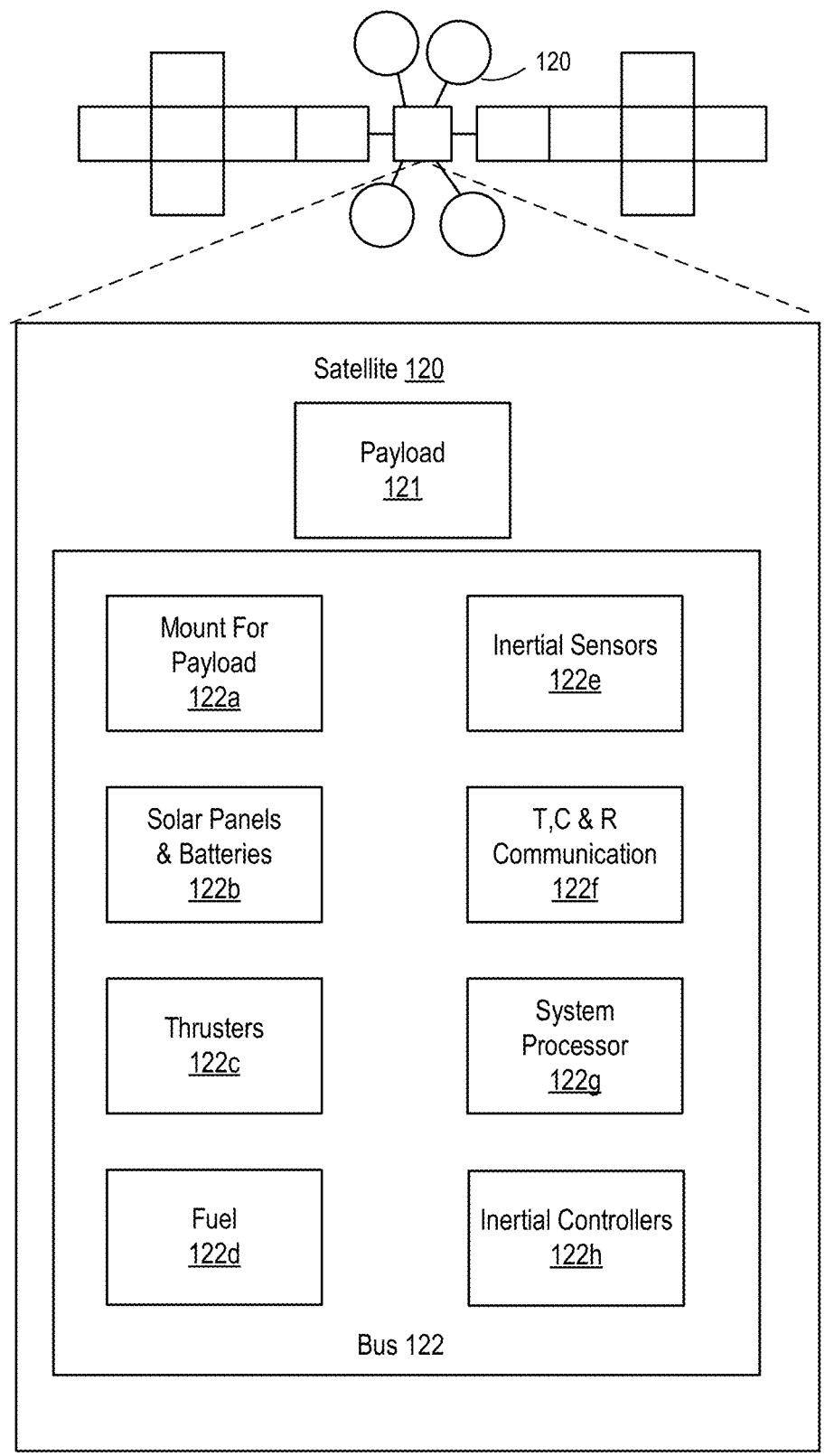
FIG. 1 is a high-level block diagram providing exemplary details of a spacecraft.

FIG. 1 is a high-level block diagram providing exemplary details of a satellite 120. The satellite 120 may be located, for example, in low Earth orbit orbital location, for example at the International Space Station (ISS) altitude of about 410 km. In one embodiment, the satellite 120 includes a bus 122 and a payload 121 carried by the bus 122. Some embodiments of the satellite 120 may include more than one payload 121. The payload 121 can be, e.g., a communication payload that provides the functionality of at least part of a communication system described herein.

In general, the bus 122 is the spacecraft that houses the payload 121. For example, the bus includes one or more mounts 122a for holding/housing payload 121, solar panels and one or more batteries 122b, thrusters 122c, fuel 122d, inertial sensors 122e, T, C & R (telemetry, commands and ranging) communication and processing equipment 122f, and system processor 122g. T, C & R may referred to by other names, such as T, T & C (tracking, telemetry and control), as is known in the art. Solar panels and batteries 122b are used to provide power to satellite 120. Thrusters 122c and inertial controllers 122h are used for changing the position or orientation of satellite 120 while in space. Fuel 122d is for the thrusters. Inertial sensors 122e are used to determine the position and orientation of satellite 120. T, C & R communication and processing equipment 122f, includes communication and processing equipment for telemetry, commands from the ground to the satellite and ranging to operate the satellite. System processor 122g is used to control and operate satellite 120. An operator on the ground can control satellite 120 by sending commands via T, C & R communication and processing equipment 122f to be executed by system processor 122g. The system processor 122g includes memory and code operable to instruct the processor to perform the methods described herein. In one aspect, the inertial controllers and inertial sensors may be referred to as an attitude control subsystem may further involve the use of rotating wheels, which are referred to as reaction wheels, internal to the spacecraft body. The rotation rates of these wheels may be altered to generate torques on the spacecraft body to cause it to rotate around its axes, including its roll axis. An attitude control subsystem of this type was involved in U.S. Pat. No. 6,164,597 by Barker et al. to rotate the spacecraft around an axis that points toward the primary body, the yaw axis.

Figure 2B:
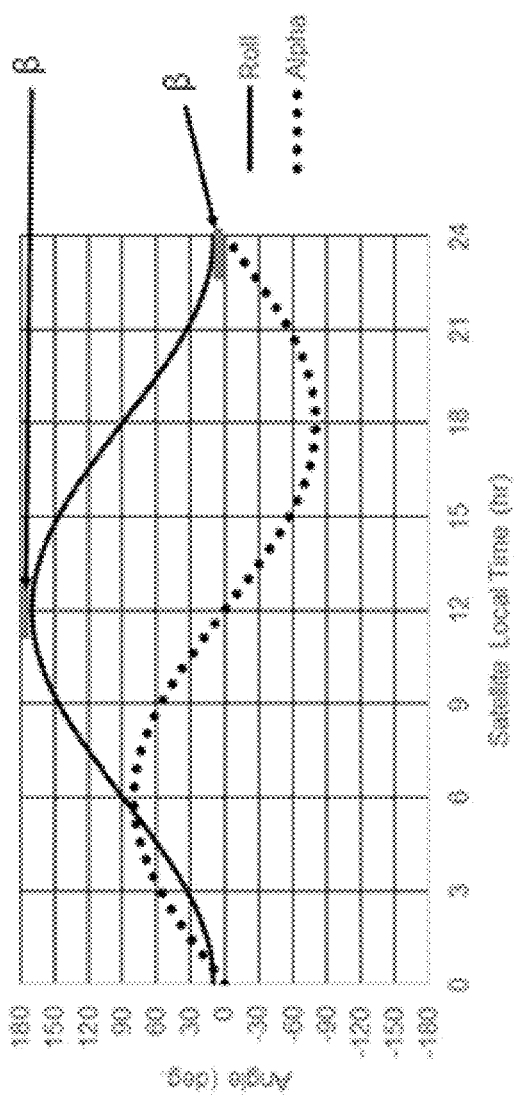
FIG. 2B is a graph of the roll and alpha angles in relation to the satellite local time.
Figure 2A:
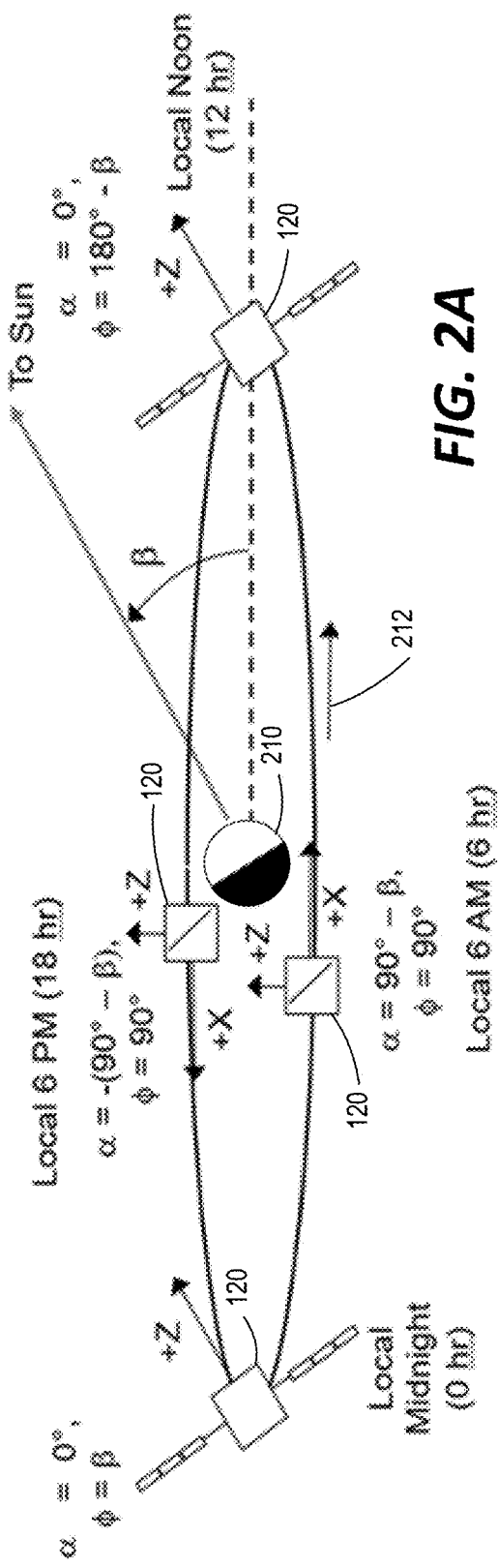
FIG. 2A illustrates a spacecraft 120 at four points during its orbit about a primary body.

FIGS. 2A and 2B illustrate true roll steering. FIG. 2A illustrates a spacecraft 120 at four points during its orbit about a primary body 210—local midnight (00:00 hrs), local 6 AM (06:00), local noon (12:00) and local 6 PM (18:00). The spacecraft 120 moves along an axis "X" in a direction of orbital motion 212. Roll steering comprises the rotation of a spacecraft about its axis in the direction of orbital motion (the X axis). In FIGS. 2A and 2B, the angle (ϕ) represents the amount of roll steering of the spacecraft and the angle (α) represents the amount of solar array steering around its own axis, which is parallel to the spacecraft Y axis. The Y-axis is an axis in the plane defined by the solar arrays and which, in the context of this technology, should be maintained normal to the direction to the sun (i.e. the direction to the sun is perpendicular to this spacecraft face, which may be referred to as the spacecraft Y face.) In this case the spacecraft axis which is directed at the center of the earth if the roll angle is zero, the +Z-axis, is included to display the orientation of the spacecraft when the roll axis (+X-axis) is hidden behind the spacecraft body or otherwise difficult to observe from the perspective of the viewer. As illustrated in FIG. 2A, when a spacecraft orbits a primary body 210, it does so in an orbital plane. The orbital plane forms an angle β relative to the sun and it is desirable to orient the solar array(s) of the spacecraft, which have one or more generally planar surfaces which are commonly aligned to each other, so that the surface(s) of the solar arrays face the sun and are aligned with respect to the sun for optimal efficiency. This also has the effect of causing the normal to the solar array panels (an axis perpendicular to the planes formed by the solar panels and illustrated in FIG. 2A) to be in the direction of the sun. The spacecraft +X-axis always points in the direction of motion for roll body steering and the solar array is rotated to maintain pointing at the sun. In true roll steering, the spacecraft is rotated throughout its orbital path so that the normal to the solar array is in the direction of the sun at all points in the obit.

FIG. 2B is a graph of the roll and alpha angles in relation to the SLT. As shown therein, the roll angle varies between near β and 180°−β. The roll and alpha angles both vary nearly sinusoidally as the spacecraft orbits the primary body.

At certain points in the orbit, the sun is eclipsed by the primary body. True roll steering operates full-time, including during the eclipse as the spacecraft revolves around the primary body. The eclipse is centered on local midnight or 00:00 hours satellite local time (SLT). In dayside-only roll steering, roll steering to position the solar arrays relative to the sun occurs only when the spacecraft is in view of any light coming from the sun, or on the "dayside" of its orbit about the primary body.

Figure 3:
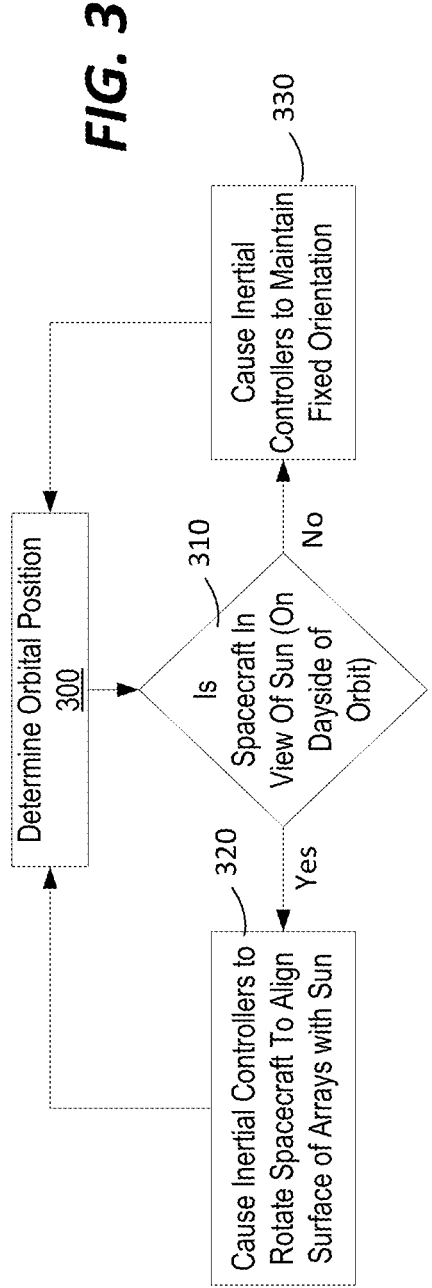
FIG. 3 is a flowchart of a method for performing dayside-only roll steering.
Figure 4:
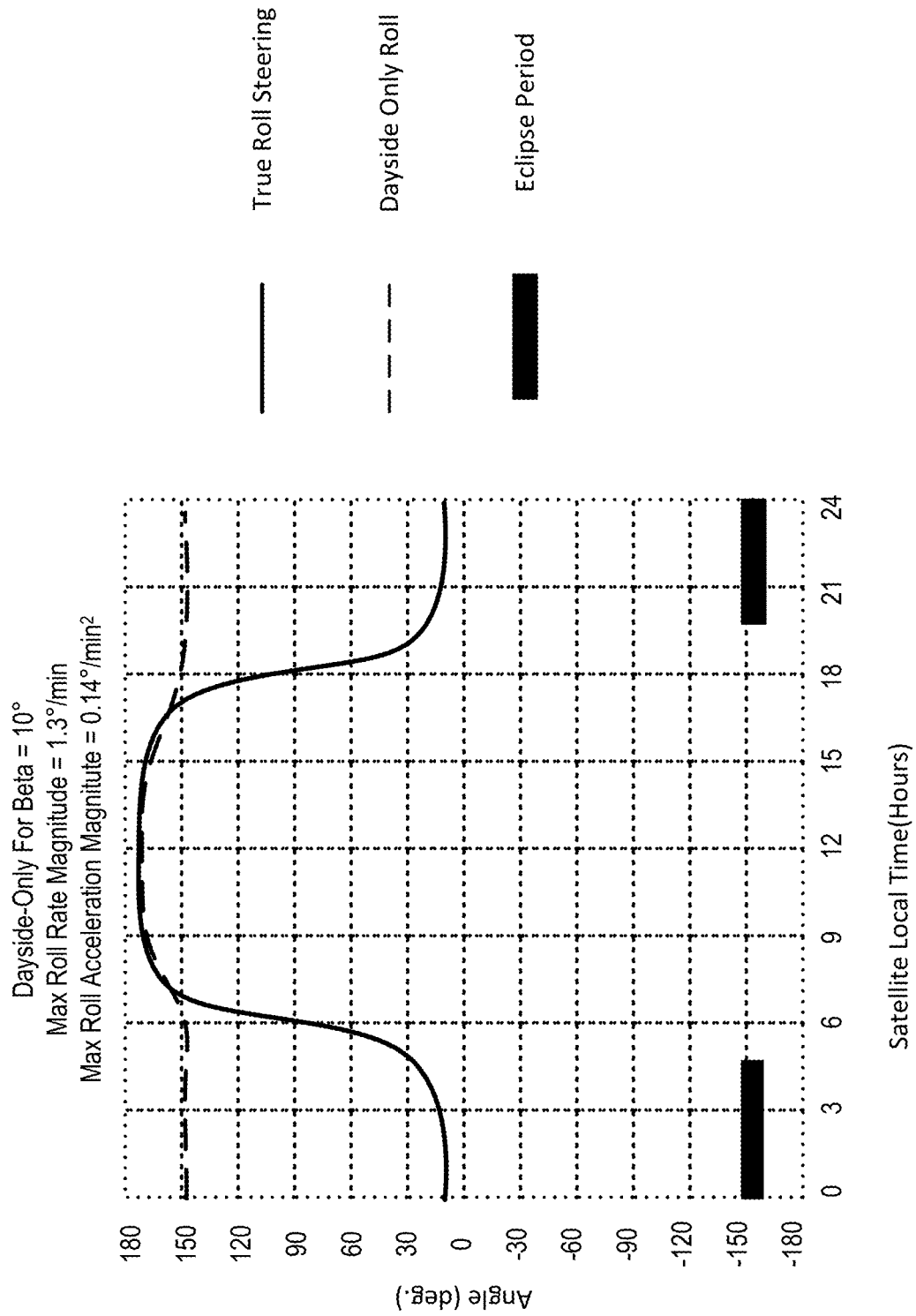
FIG. 4 is a graph comparing dayside-only roll steering to true roll steering.

FIGS. 3 and 4 illustrate dayside-only roll steering in accordance with the present technology FIG. 3 is a flowchart of a method for performing dayside-only roll steering. As illustrated in FIG. 3, at 300, the orbital position of the spacecraft is determined. At 310, a determination is made as to whether the spacecraft is in view of any light coming from the sun (i.e. not in a state of eclipse from the sun). If so, at 320 inertial controllers (122h) are controlled by the system processor (122g) to cause the spacecraft to rotate to position the solar arrays so that an axis normal to the surface(s) of the array is pointed at the sun. If not, at 330 inertial controllers (122h) are controlled by the system processor to cause the spacecraft to maintain a fixed orientation of the spacecraft body around its roll axis (the axis of the spacecraft's orbital direction i.e. X). In other aspects, described below with respect to FIG. 11, steps 320 and 330 may be suspended at certain times when the direction to the sun is near the orbit plane or Beta angle (sun angle to the orbit plane) has a magnitude of approximately 10 degrees or less.

Dayside-only roll steering can also be implemented within a spacecraft attitude control subsystem which includes control electronics, attitude sensors including star trackers and rate sensors, or other sensors, as well as reaction wheels or other actuators. No new equipment or other hardware is required for implementation. Control code to implement algorithms performing the methods described herein may be loaded into the control electronics and include the instructions to implement the techniques herein.

FIG. 4 is a graph comparing dayside-only roll steering to true roll steering. FIG. 4 shows a comparison of the amount of roll (ϕ) between true roll steering and dayside-only steering for β equal to 10°. As illustrated therein, the spacecraft is in eclipse between approximately 19:00 hours SLT and extending through 00:00 hours to 05:00 hours SLT. As illustrated in FIG. 4, a much smaller range of motion is required for dayside-only roll steering than for true roll steering. Nevertheless, dayside-only roll steering in the non-eclipse zone (between approximately 05:00 and 19:00 SLT) closely approximates true roll steering. Roll orientation is held to a fixed value (at 330 above in FIG. 3) within the portion of the orbit where eclipse occurs. The angles between the normal to the solar array and in the sun-direction—and the angles between the plane of the Y Face of the spacecraft body (the face of the spacecraft on which the solar array is stowed and which is parallel to the orbit plane when the roll angle and yaw angle are both zero) and the sun-direction vector, remain modest throughout the dayside-only roll steering cycle. Therefore, the spacecraft solar arrays can generate nearly full power when exposed to the sun. Sunlight angle with respect to the spacecraft face aligned with the spacecraft Y-axis is minimized. This is the face to which the solar arrays are attached, and when the direction to the sun is normal to the solar array panels, the direction to the sun is perpendicular to this spacecraft face, which may be referred to as the spacecraft Y face. The Y face is, where radiators and any other equipment that must not be exposed to sunlight at a steep angle are located on many spacecraft.

Figure 5:
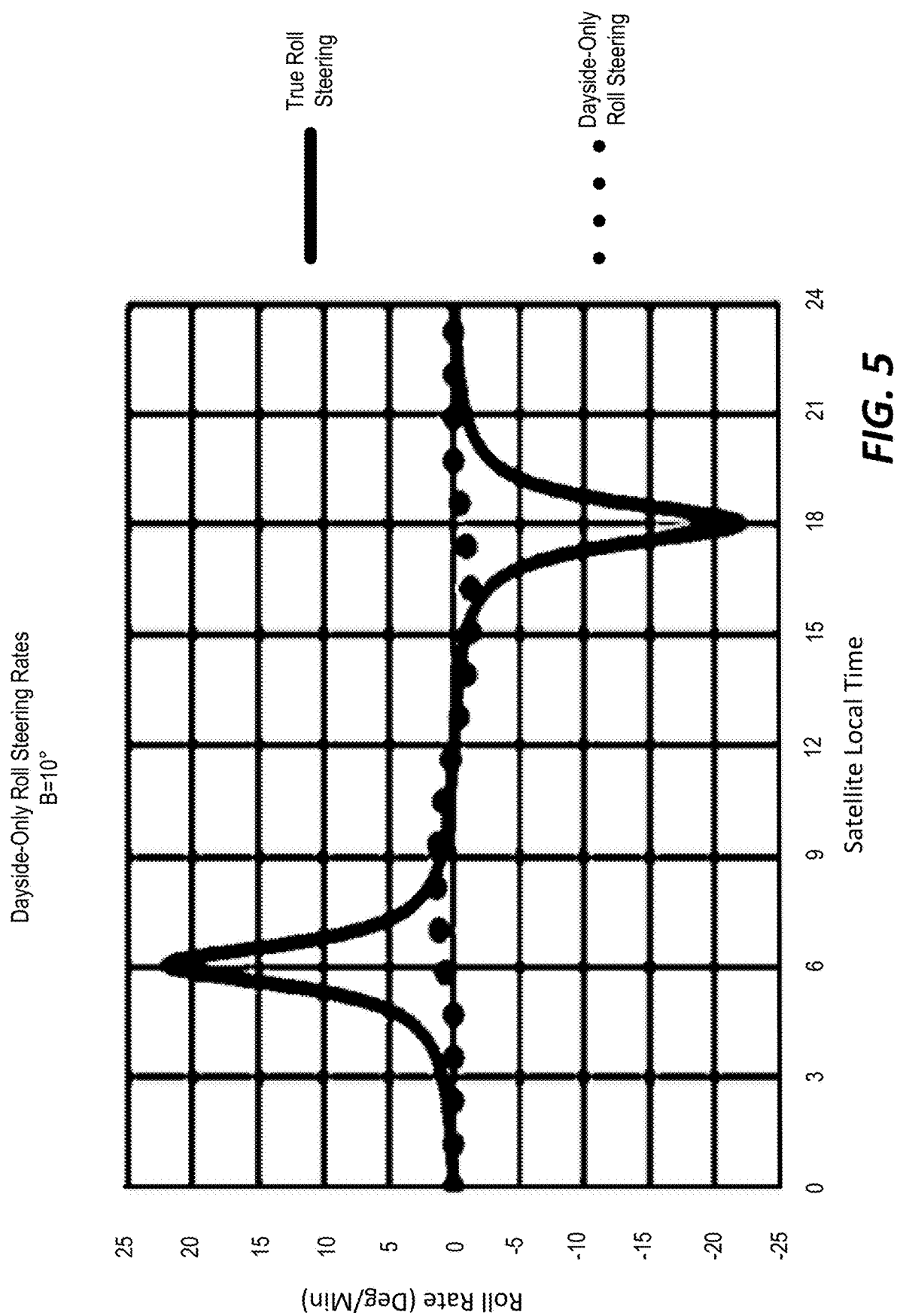
FIG. 5 is a graph of the roll rate of a satellite versus satellite local time comparing true roll steering the dayside-only roll steering.

FIG. 5 is a graph of the roll rate versus the SLT, and shows the rate of roll steering required for the dayside-only steering is far less than that required for true roll steering where the β angle is 10°. This greatly reduces the momentum-storage capability that is required of the attitude control hardware, such as reaction wheels or other actuators. The maximum angular acceleration in roll required for the dayside-only steering for this case is about 0.14 deg./min² for an orbit such as that of the International Space Station (ISS) at an altitude of 410 km. Thus, the use of dayside-only steering reduces the torque capability required of the reaction wheels or other actuators by nearly a factor of 40 in this case. For true roll steering the maximum roll acceleration—the graph of FIG. 2B—would be 5.4 deg./min².

Figure 6A:
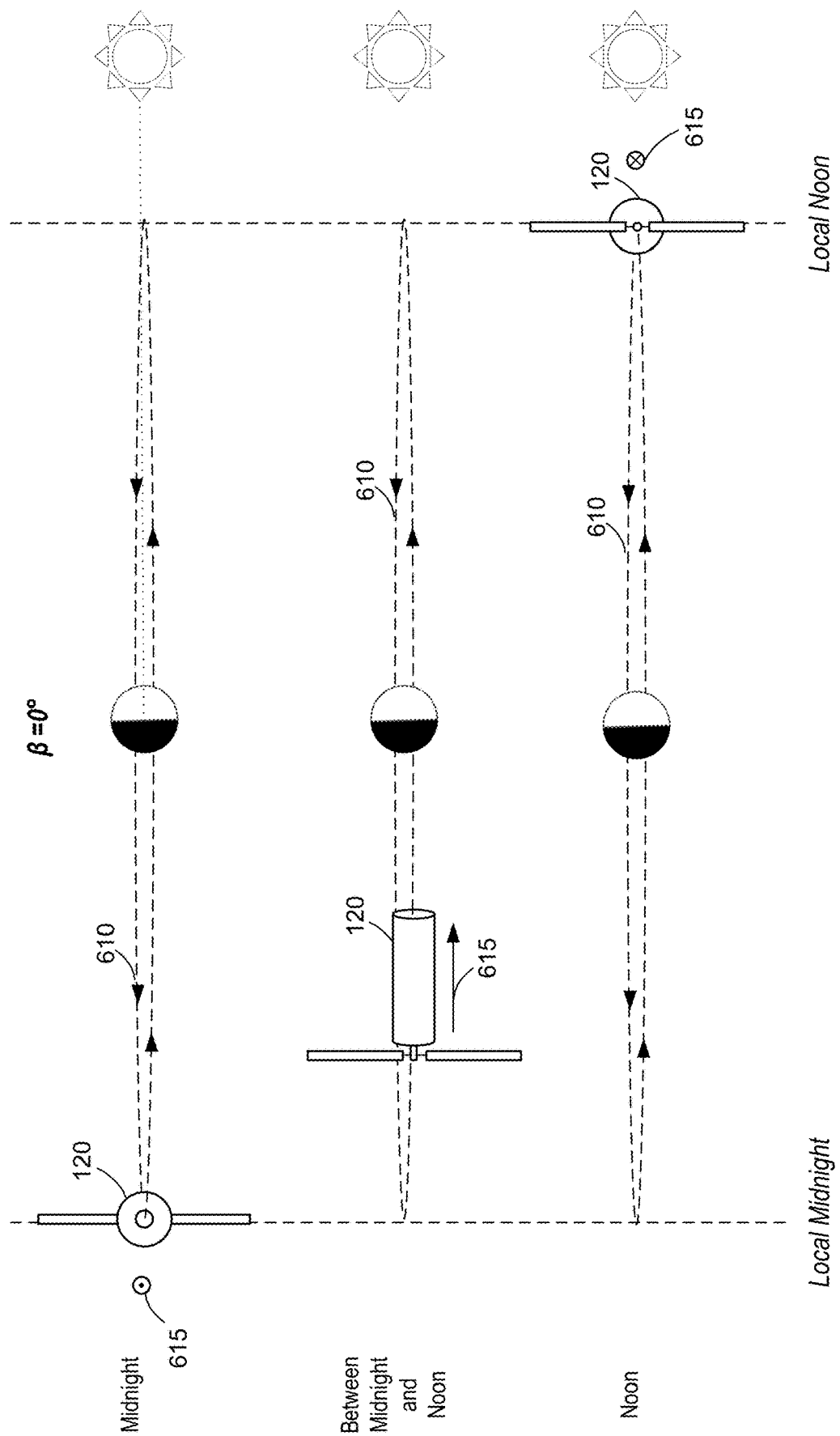
Figure 6C:
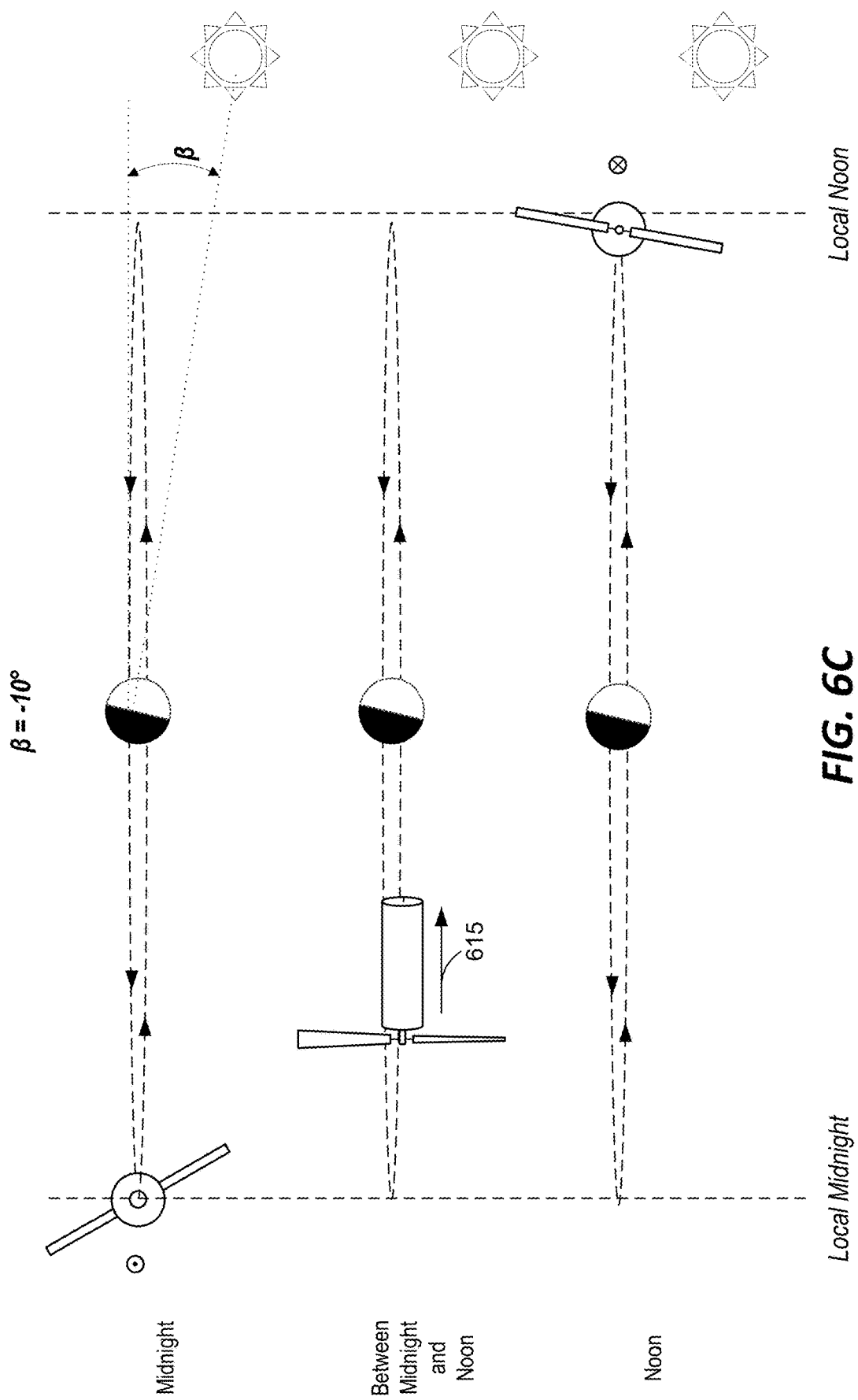

FIGS. 6A-C through 10 illustrate the change in roll rate for different values of β. Each of FIGS. 6A-6C illustrates a spacecraft 120 moving at three positions between midnight and noon—one at midnight, one at noon, and one at approximately 0600 SLT—along an orbital path 602 having a direction of orbital motion, with the view being in the orbital plane. In FIG. 6A, β equals 0°. As illustrated therein, spacecraft orientation for low magnitude β, dayside-only roll steering is similar to a no roll steering/orbit normal case. Nominally, the nadir pointing axis or yaw axis remains near the centroid of the primary body.

FIG. 6B illustrates a spacecraft 120 at the three positions between midnight and noon where β is positive 10°. The roll biases listed in this figure and in FIG. 6C are taken from a different condition than in the earlier figures, such as FIB. 2B. In FIGS. 6B and 6C, the condition is biased 180° away from the original reference condition. In the case of FIG. 6B, the roll bias at midnight is −33° and at noon is −10°. FIG.

6C illustrates a spacecraft 120 at the three positions between midnight and noon where β is −10°. Consequently, for a β of −10°, the roll bias at midnight is +33° and at noon is +10°.

Figure 7:
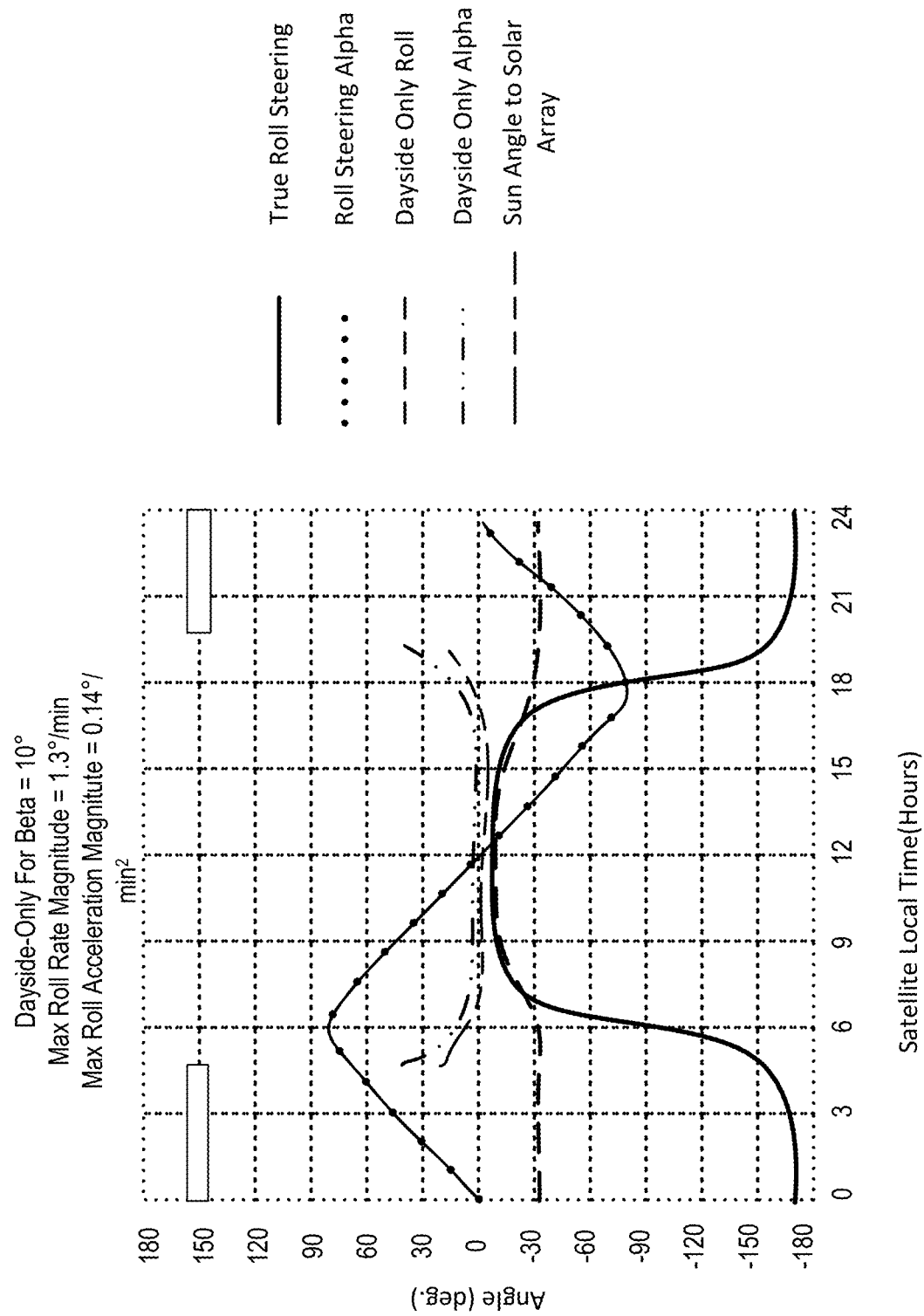
FIG. 7 is a graph of various roll rates of a satellite versus satellite local time comparing true roll steering the dayside-only roll steering where the orbital plane of the spacecraft relative to the sun or Beta angle forms an angle with a value of +10°.
Figure 8:
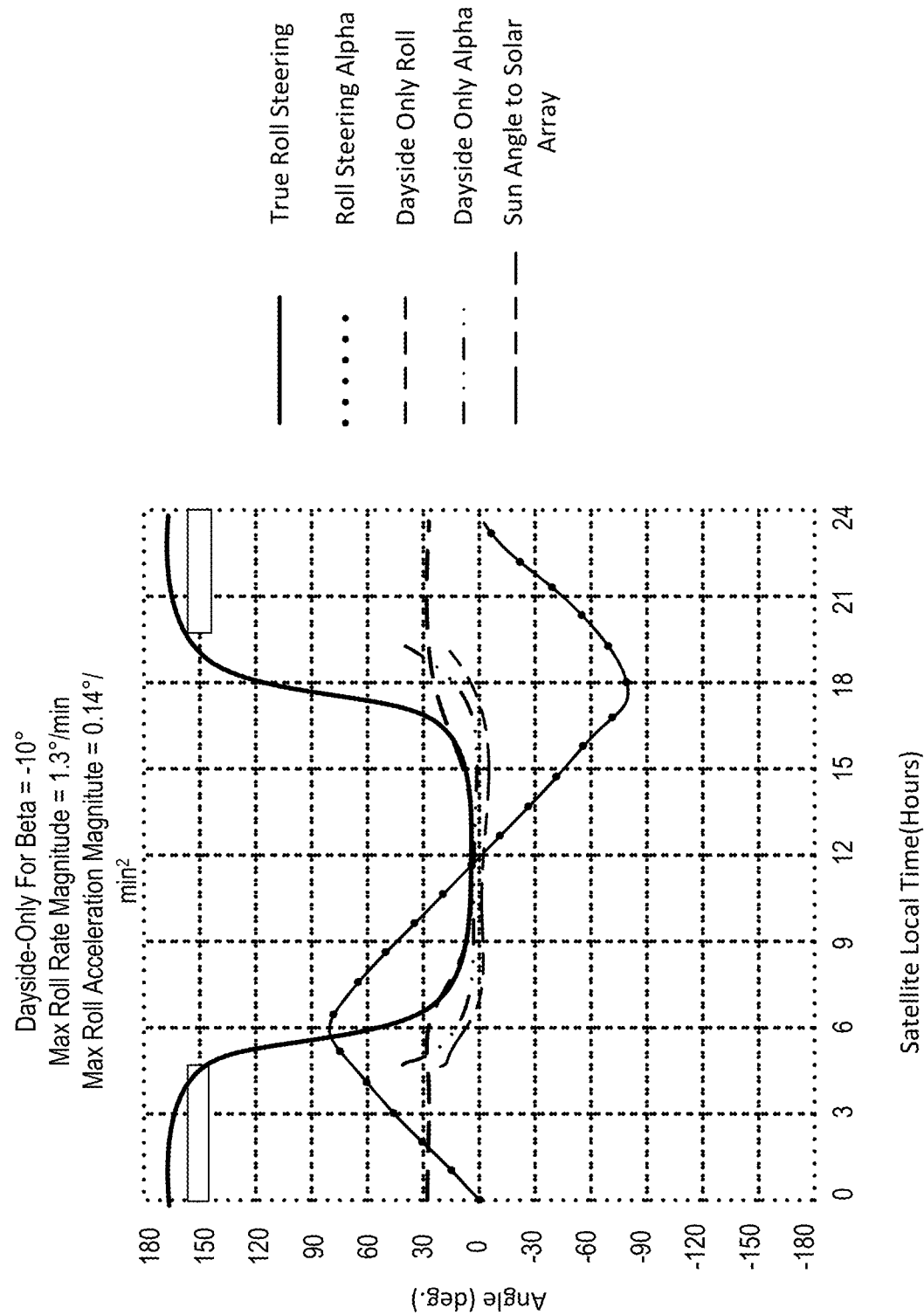
FIG. 8 is a graph of various roll rates of a satellite versus satellite local time comparing true roll steering the dayside-only roll steering where the orbital plane of the spacecraft relative to the sun forms an angle −10°.

FIGS. 7 and 8 are graphs of various roll rates of a satellite versus SLT comparing true roll steering the dayside-only roll steering where the orbital plane of the spacecraft relative to the sun forms an angle+10° and −10°, respectively. FIGS. 7 and 8 illustrate a comparison of the amount of roll (φ) between true roll steering and dayside-only steering for β equal to positive and negative 10° respectively. As in FIGS. 6B and 6C, in FIGS. 7 and 8, the roll orientation has been referenced to a different condition 180° away from the condition used as a reference in the earlier figures, such as FIG. 2B. (The motion is the same, only the reference condition for roll has been changed in FIGS. 7 and 8.) As illustrated in these figures, the relative roll orientations during the non-eclipse period again closely approximate each other, but are flipped relative to the change in sign of β. FIG. 7 corresponds to the situation depicted in FIG. 6B and FIG. 8 corresponds to the situation depicted in FIG. 6C.

Figure 9:
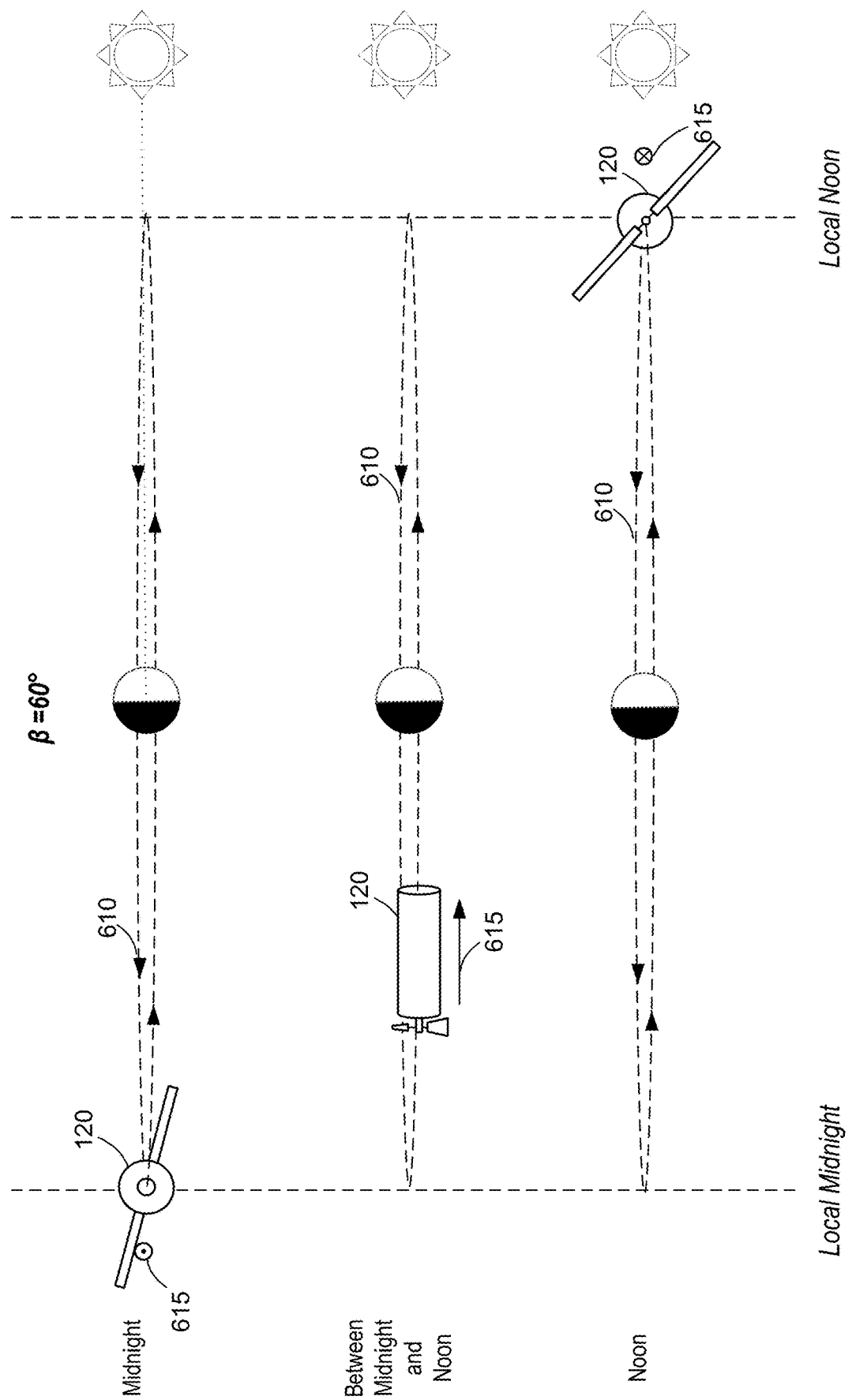
FIG. 9 is an illustration of a spacecraft orbiting a primary body where the orbital plane of the spacecraft relative to the sun forms an angle of 60°.
Figure 10:
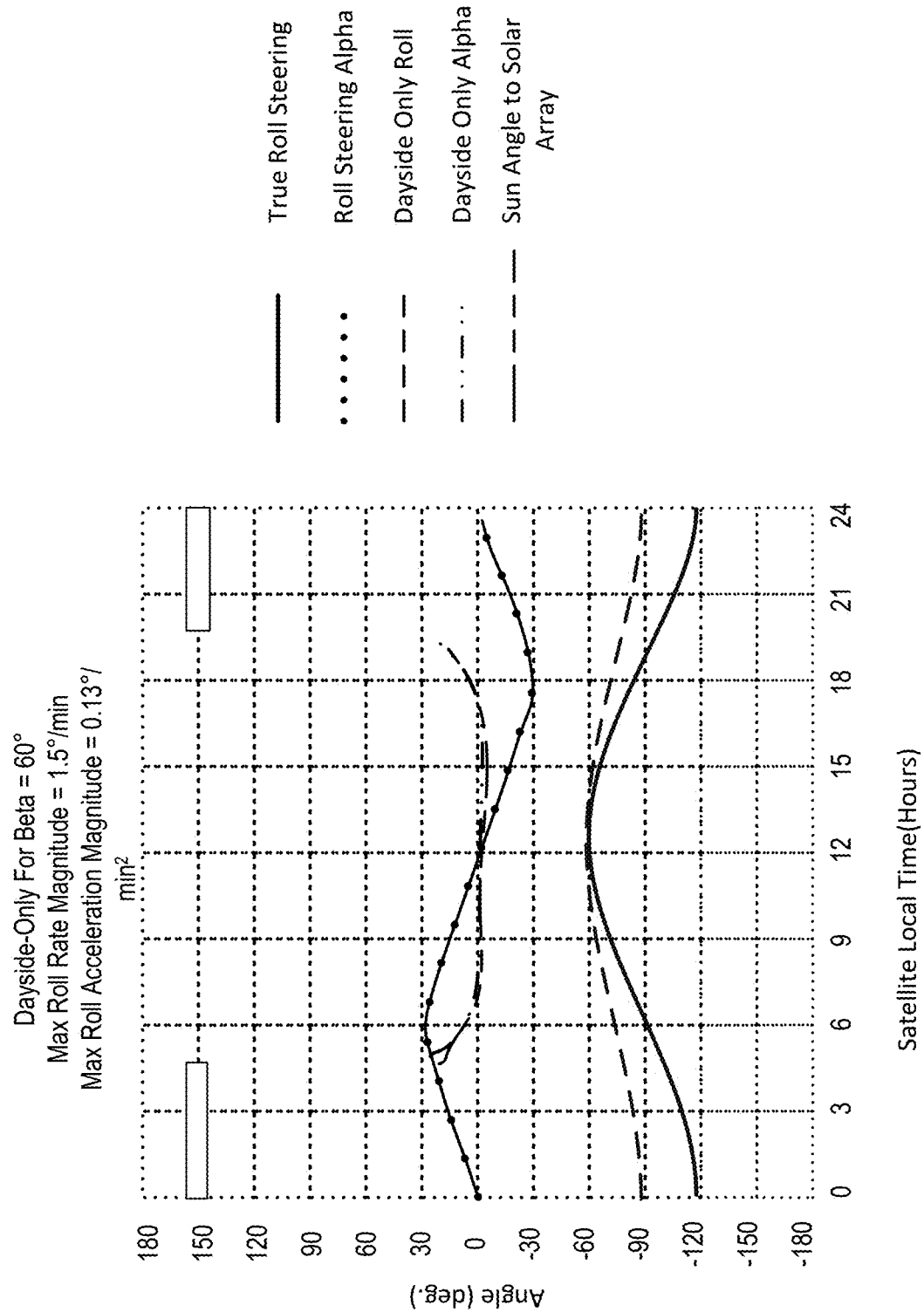
FIG. 10 is a graph of various roll rates of a satellite versus satellite local time comparing true roll steering the dayside-only roll steering where the orbital plane of the spacecraft relative to the sun forms an angle 60°.

FIG. 9 illustrates a more extreme case of β equal to 60°. FIG. 9 is an illustration of a spacecraft orbiting a primary body where the orbital plane of the spacecraft relative to the sun makes an angle of 60°. As shown at midnight at noon, the roll bias at midnight is −91° and at noon is −61°. FIG. 10 is a graph similar to FIGS. 7 and 8 of various roll rates of a satellite versus SLT comparing true roll steering the dayside-only roll steering where the orbital plane of the spacecraft relative to the sun forms an angle 60°. As illustrated in FIG. 10, the roll rate magnitude increases to 1.5 deg/min, with a maximum roll acceleration of 0.13 deg/min² since the amount of dayside only roll required is essentially the same as the +/−10 degree β cases. As illustrated, for both the case of β equal to 10° and β equal to 60°, although there is a slight increase in the maximum roll rate magnitude (1.4 deg/min for β equal to 10° and 1.5 deg/min for β equal to 60°), both the maximum roll rate and the maximum roll acceleration are relatively constant for various angles of β.

Figure 11:
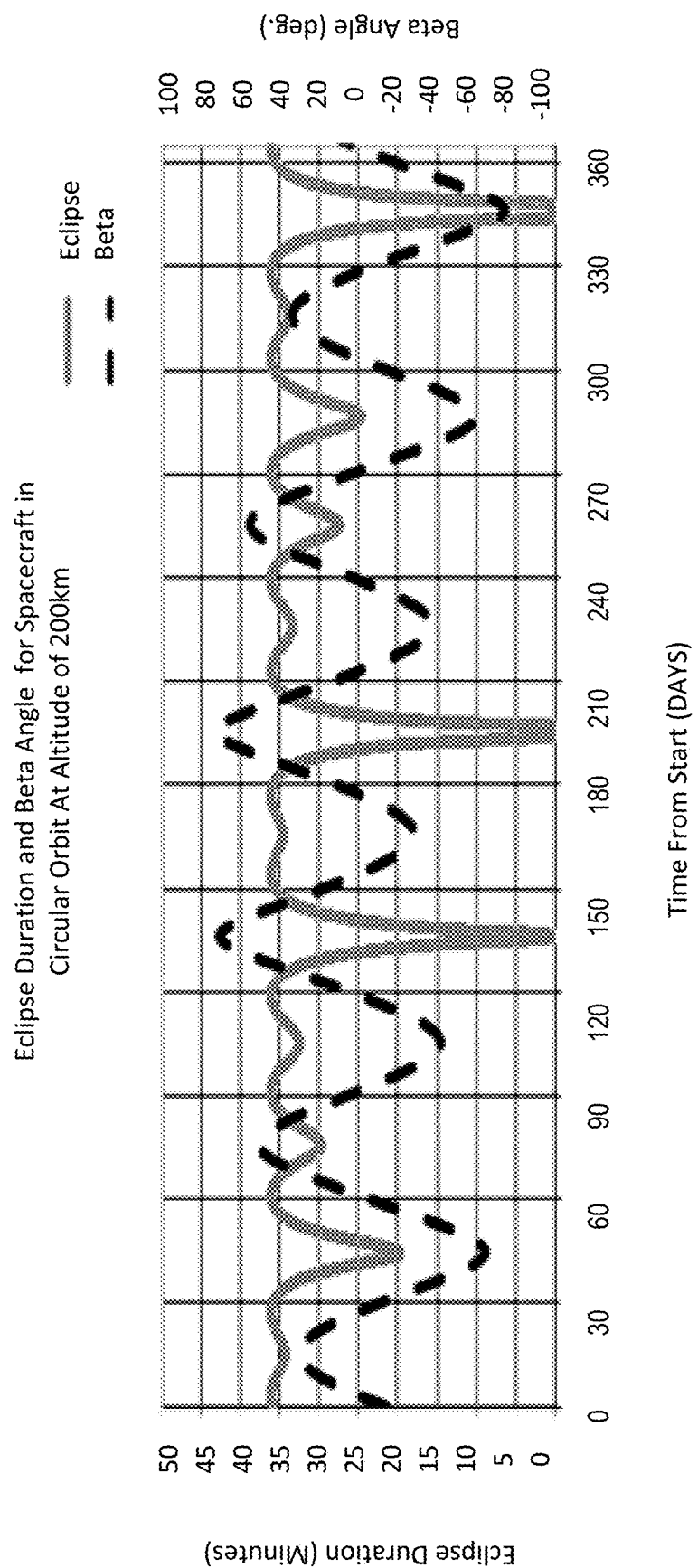
FIG. 11 is a graph of eclipse duration and beta angle for spacecraft in circular orbit at an altitude of 200 km.

In another aspect of the technology, dayside-only roll steering may be suspended when the direction to the sun is near the orbit plane or β angle (sun angle to the orbit plane) is nearly zero. FIG. 11 is a graph of eclipse duration and beta angle for spacecraft in circular orbit at an altitude of 200 km. FIG. 11 illustrates eclipse duration relative to the β angle for a spacecraft in circular orbit with an altitude of about 410 km and a local time of day of ascending node initially set to 00:00 hours with a start date of January 1. As shown therein, the β angle (sun angle to the orbit plane) is nearly zero about once a month in the orbit selected for this mission (410 km altitude, 51.6° inclination). This is also the time of maximum eclipse duration of about 36 minutes, which is about 40% of the approximately 93-minute orbital period. Time out of eclipse is about 57 minutes. There are eclipse-free spans that last up to 5 days, which correspond to the maximum β angle magnitude of about 75°, about 10 eclipse-free days per year, and 5500 eclipses per year, or an average of about 15 eclipses per day. It will be recognized that FIG. 11 illustrates an orbit which is exemplary, but the technology can be applied to various orbital periods and the roll steering is suspended when the Beta angle magnitude is less than a specified value, for example 10°.

The technology permits the spacecraft to perform maneuvers using its thrusters at any time in the forward and aft directions, which the prior art in U.S. Pat. No. 6,164,597 by Barker et al. which describes yaw steering does not. Forward and aft maneuvers using thrusters can only be performed if Yaw Steering is suspended, and if Yaw Steering is suspended at most times, the power generated by the solar arrays is greatly reduced. Forward maneuvers are essential to compensate for the effects of atmospheric drag in low altitude orbits, which are the principal perturbations that disturb operations in this regime. Aft maneuvers are needed if a spacecraft is to undertake formation flying with other spacecraft or objects in space. This technology also permits spacecraft steering to be performed at times when it is of the most use, when the spacecraft is in sunlight, while avoiding active steering when the spacecraft is in eclipse, when it does not matter whether the solar arrays are aligned with the sun or not. This reduces the range of spacecraft body rotation, minimizes the spacecraft body rate of rotation and minimizes the change in rate or acceleration of the spacecraft body rotation.

This technology enables a spacecraft in low-orbit to undertake atmospheric drag compensation or formation-flying maneuvers at any time. By permitting steering to be performed only on the day side of Earth, the range of body rotation, body rate of rotation and the acceleration of the spacecraft body are minimized. This has the advantages of permitting Earth-pointing equipment to remain in view of Earth, minimizing the change in spacecraft body angular momentum by reducing the range of rate of rotation, thus permitting any momentum-storage device such as reaction wheels (RWs) or control moment gyros (CMGs) to have minimum storage capacity and minimizing spacecraft body angular acceleration permits the torque generating capability of the RWs or CMGs to be minimized. Minimizing wheels or CMG momentum storage and torque-generating capability helps reduce the cost and mass of these devices.

This technology allows for the use of existing hardware, permitting simpler, less expensive equipment such as single-axis solar arrays to be included.

If the technology were used on a spacecraft carrying people, power available from the solar array would be near its capacity even if the solar array were of a simple design, unlike the expensive two-axis solar array on the ISS. The minimal roll motion of the spacecraft would reduce the chances of people contracting motion sickness and would permit Earth to be viewed at a many times during the mission from a window constructed on the Earth-facing side of the spacecraft. While Earth viewing would not be available at all times, it would be available continuously for weeks.

This technology could also be adapted to provide dayside-only Yaw Steering, which could simplify the implementation of this mature technology and permit it to be used for new applications.

As noted herein, the technology provides that a spacecraft undertake roll steering only during the time that the sun is illuminating the spacecraft and maintaining a fixed attitude or orientation in roll when the spacecraft is experiencing an eclipse. Spacecraft orientation in roll with respect to the sun is only important when it is view of the sun, spacecraft orientation in eclipse can be driven by other considerations This technology minimizes spacecraft motion in roll, thus simplifying the attitude control actuators, specifically reaction wheels or other angular moment storage and torque-generating devices. The restricted motion of the spacecraft in roll also facilitates having one side of the spacecraft be directed toward Earth for about a month or possibly longer, depending on orbit period, so Earth-observing payloads can operate at all times during these month-long time spans. The reduction of roll motion also makes life more comfortable for humans aboard a space station which employs this steering technique, instead of full-time or true roll steering, which would entail a greater range of roll rotation, also more rapid motion and greater acceleration in roll The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

What is claimed is:

1. A method of orienting a spacecraft that orbits about a primary body, the spacecraft having a solar array having a surface, comprising: establishing an orbital path of the spacecraft about the primary body, the spacecraft having a direction of orbital motion having along the orbital path; determining a portion of the orbital path during which the spacecraft is in eclipse; and roll steering the spacecraft about an axis in the direction of orbital motion to position the surface of the solar array such that an axis normal to the surface of the array is aligned at a minimum roll angle with respect to the direction to a sun only when the spacecraft is not in eclipse by selectively applying a force to the spacecraft that rotates the spacecraft body about the axis in the direction of orbital motion, wherein the method further includes maintaining a fixed attitude of the spacecraft when the spacecraft is in eclipse.

2. The method of claim 1 wherein the orbital path forms an orbital plane and a Beta angle is formed between the orbital plane and a ray from the primary body in a direction to the sun, and the roll angle is determined by the Beta angle.

3. The method of claim 1 wherein the roll steering has a maximum roll rate magnitude about the axis in the direction of orbital motion which is relatively constant for all Beta angles.

4. The method of claim 1 wherein the roll steering has a maximum roll acceleration about an axis in the direction of orbital motion which is relatively constant for all Beta angles.

5. The method of claim 1 wherein the method includes performing spacecraft maneuvers at any time in a forward and aft direction along the axis in the direction of orbital motion while roll steering is performed.

6. The method of claim 1 wherein the orbit has an orbital period, wherein the orbital path forms an orbital plane and a Beta angle is formed between the orbital plane and an axis from the orbital body toward the sun, and roll steering is suspended when the Beta angle magnitude is less than a threshold value.

7. A method of rotating a body of a spacecraft with solar arrays around a roll axis comprising an axis in a direction of orbital motion of the spacecraft, an orbital motion following an orbital path defining an orbital plane, the method comprising:
determining a portion of the orbital path during which the spacecraft is in eclipse by a primary body; and
steering the spacecraft about the roll axis to position a surface of a solar array of the spacecraft such that an axis normal to the surface of the solar array is aligned in a direction to a sun when the sun is visible to the spacecraft by selectively applying a force to the spacecraft that rotates the body of the spacecraft about the roll axis; and
maintaining a fixed orientation of the spacecraft about the roll axis when the sun is not visible to the spacecraft.

8. The method of claim 7 wherein the orbital path forms an orbital plane and a Beta angle is formed between the orbital plane and a ray from the primary body in a direction to the sun, and the steering has a maximum roll rate magnitude about the roll axis which is relatively constant for all Beta angles.

9. The method of claim 7 wherein the orbital path forms an orbital plane and a Beta angle is formed between the orbital plane and a ray from the primary body in a direction to the sun, and the steering has a maximum roll acceleration about roll axis which is relatively constant for all Beta angles.

10. The method of claim 7 wherein the method includes performing spacecraft maneuvers at any time in a forward and aft direction along the roll axis in the direction of orbital motion while roll steering is performed.

11. The method of claim 1 wherein the orbital path forming an orbital plane and having an orbital period, and wherein the roll steering is suspended when the orbital plane and an axis between the primary body and the sun form a Beta angle which has a magnitude less than threshold value.

12. A spacecraft, comprising:
a solar array having at least one surface;
a propulsion subsystem;
an attitude control subsystem; and
a controller connected to the propulsion subsystem and an inertial control subsystem, the controller configured to cause the propulsion subsystem and inertial control subsystem to propel the spacecraft along an orbital path in orbital motion around a primary body, and the controller configured to cause the attitude control subsystem to rotate the spacecraft around a roll axis comprising an axis in a direction of orbital motion of the spacecraft, the orbital motion defining an orbital plane, the controller causing the inertial control subsystem to
steer the spacecraft about the roll axis to position the surface of the solar array such that an axis normal to the surface of the solar array is at a minimum angle in the direction to a sun when the sun is visible to the spacecraft; and
maintain a fixed orientation of the spacecraft about the roll axis when the sun is not visible to the spacecraft.

13. The spacecraft of claim 12 wherein the orbital path forms an orbital plane and an axis between the primary body and the sun form a second angle, and the roll angle is determined by the second angle.

14. The spacecraft of claim 12 wherein the controller configured to cause the attitude control subsystem to rotate the spacecraft at a maximum roll rate magnitude about the roll axis which is relatively constant for all roll angles.

15. The spacecraft of claim 12 wherein the orbital path forms an orbital plane and a Beta angle is formed between the orbital plane and a ray from the primary body in a direction to the sun, and the controller configured to cause the attitude control subsystem to rotate the spacecraft at a maximum roll rate acceleration about the roll axis which is relatively constant for all Beta angles.

16. The spacecraft of claim 12 wherein the controller configured to cause the inertial control subsystem and the propulsion control subsystem to perform spacecraft maneuvers at any time in a forward and aft direction along the orbital path the direction of orbital motion while the controller causing the attitude control subsystem to steer the spacecraft about the roll axis.

17. The spacecraft of claim 12 wherein the orbit has an orbital period, wherein the orbital path forms an orbital plane and a Beta angle is formed between the orbital plane and an axis from the primary body toward the sun, and wherein the controller configured to cause the attitude control subsystem to suspend the steering when the magnitude of the Beta angle is less than about 10 degrees.

18. The spacecraft of claim 13 wherein the orbit has an orbital period, wherein the orbital path forms an orbital plane and a Beta angle is formed between the orbital plane and an axis from the primary body toward the sun, and wherein the controller configured to cause the attitude control subsystem to suspend the steering when the magnitude of the Beta angle is less than about 10 degrees.

* * * * *

UNITED STATES PATENT AND TRADEMARK OFFICE
CERTIFICATE OF CORRECTION

PATENT NO. : 11,827,382 B2
APPLICATION NO. : 17/076444
DATED : November 28, 2023
INVENTOR(S) : Andrew E. Turner It is certified that error appears in the above-identified patent and that said Letters Patent is hereby corrected as shown below:

In the Claims

Column 10, Line 13 (Claim 9): please replace "about roll" with --about the roll--

Column 10, Line 19 (Claim 11): please replace "claim 1" with --claim 8--

Column 10, Line 23 (Claim 11): please replace "than threshold" with --than a threshold--

Column 10, Lines 50-51 (Claim 14): please replace "controller configured" with --controller is configured--

Column 10, Lines 61-62 (Claim 16): please replace "controller configured" with --controller is configured--

Column 12, Lines 17-23 (Claim 18): please replace "18. The spacecraft of claim 13 wherein the orbit has an orbital period, wherein the orbital path forms an orbital plane and a Beta angle is formed between the orbital plane and an axis from the primary body toward the sun, and wherein the controller configured to cause the attitude control subsystem to suspend the steering when the magnitude of the Beta angle is less than about 10 degrees." with --18. The method of claim 12 wherein the orbit has an orbital period, wherein the orbital path forms an orbital plane and a Beta angle is formed between the orbital plane and an axis from the orbital body toward the sun, and roll steering is suspended when the spacecraft is not in eclipse and when the Beta angle magnitude is less than a threshold value.--

Signed and Sealed this
Twenty-seventh Day of February, 2024

Katherine Kelly Vidal
*Director of the United States Patent and Trademark Office*